United States Patent [19]
Külper et al.

[11] Patent Number: 5,843,547
[45] Date of Patent: Dec. 1, 1998

[54] MULTILAYERED LABEL

[75] Inventors: Klaus Külper, Pinneberg; Hans-Christian Riekhof; Arne Koops, both of Hamburg, all of Germany

[73] Assignee: Beiersdorf AG, Hamburg, Germany

[21] Appl. No.: 644,090

[22] Filed: Mar. 12, 1996

[30] Foreign Application Priority Data

Mar. 16, 1995 [DE] Germany .................. 195 09 505.7

[51] Int. Cl.$^6$ ..................................... G09F 3/00
[52] U.S. Cl. .................. 428/40.1; 283/81; 428/40.2; 428/41.5; 428/41.6; 428/41.7; 428/42.1; 428/42.2; 428/203; 428/354; 428/480; 430/945; 524/495; 524/496
[58] Field of Search ................. 428/40.1, 40.2, 428/41.5, 41.6, 41.7, 42.1, 42.2, 203, 354, 343, 480; 430/945; 283/81; 524/495, 496; 106/21 A

[56] References Cited

U.S. PATENT DOCUMENTS

| | | |
|---|---|---|
| 4,064,390 | 12/1977 | Hildebrand et al. ............. 235/470 |
| 4,927,180 | 5/1990 | Trundle ............................ 283/70 |
| 5,215,817 | 6/1993 | Chu ................................... 428/330 |
| 5,262,470 | 11/1993 | Shimotsuma ..................... 524/496 |
| 5,290,067 | 3/1994 | Langen ............................. 283/60.1 |
| 5,340,628 | 8/1994 | McKillip ........................... 428/40 |
| 5,389,414 | 2/1995 | Popat ................................ 428/40.1 |
| 5,500,040 | 3/1996 | Fujinami .......................... 106/21 A |
| 5,628,966 | 5/1997 | Küpler et al. .................... 428/423.1 |

FOREIGN PATENT DOCUMENTS

| | | |
|---|---|---|
| 0065766 | 12/1982 | European Pat. Off. . |
| 0 190 997 | 8/1986 | European Pat. Off. . |
| 0 198 771 | 10/1986 | European Pat. Off. . |
| 8130861 | 1/1983 | Germany . |
| 3917294 | 11/1990 | Germany . |
| 39 25 563 A1 | 2/1991 | Germany . |
| 3925563 | 2/1991 | Germany . |
| 4108377 | 9/1992 | Germany . |
| 41 34 271 C1 | 12/1992 | Germany . |
| 19509505 | 1/1996 | Germany . |

OTHER PUBLICATIONS

J. Mvers, Modern Plastic International, vol. 23, No. 10, pp. 29–31 (1993).

*Primary Examiner*—Nasser Ahmad
*Attorney, Agent, or Firm*—Sprung Kramer Schaefer & Briscoe

[57] ABSTRACT

Multilayered label comprising a) a base layer made of plastic containing b) an additive which exhibits a color change under light radiation, in particular laser irradiation, and which c) is coated on one side with a self-adhesive composition which d) is, if desired, covered by a release paper or a release film, where e) the base layer is covered on the other side by one or more protective films arranged one on top of the other which f) are transparent, permeable to laser irradiation and are provided with a self-adhesive coating.

11 Claims, No Drawings

MULTILAYERED LABEL

The invention relates to a multilayered label having a base layer of plastic containing an additive which exhibits a colour change on irradiation with light, in particular a laser, and which is covered by one or more protective films.

BACKGROUND OF THE INVENTION

1. Field of the Invention

For the identification of products, control of production processes and quality control, automatically readable information carriers are frequently utilized. The metal plates used in the past are being replaced by modern systems such as bar codes or electronic data carriers. The latter are frequently unsuitable for cost reasons, owing to specific ambient conditions, such as high temperatures, contact with chemicals and usage in areas with strong electromagnetic fields. If stresses which can result in more or less complete destruction of the data set, such as mechanical loads, contact with aggressive chemicals or covering of the information during painting processes, occur during the functional life of the information carrier, "normal" single-layer labels are unsuitable.

2. Description of the Prior Art

For these fields of application, multilayered data carrier systems, described in EP 065 766 B1, are available: a plate-like code carrier is firmly attached to the workpiece, giving a multilayered structure. The information is applied to the bottommost layer, the base label, for example by standard printing methods, such as matrix printing, thermal transfer, etc. One or more layers of a transparent, self-adhesive protective film are removably attached on top. After work operations, for example painting, the uppermost protective film is in each case peeled off along with the paint layer and removed; the original information is free for further use. Suitable non-adhesive tabs make it easier for the user selectively to remove the uppermost layer in each case. Sandwich systems of this type are used, for example, as process control aids in the form of self-adhesive labels during application of corrosion protection and during painting of automotive bodies.

However, the production of multilayered data carriers of this type is complex; in order to ensure just-in-time manufacture, the user must be supplied separately with two different labels—a base label, which must be printed on site in accordance with the current production orders, and the single- or multilayered protective label. Two separate unrolling operations for the labels, the logistics for two different label products, high accuracy requirements during production of the base label/protective label(s) structure, continuous monitoring, and need to change the ink ribbon/replenish the printing ink at the right time make this process complex and labour-intensive.

Labels which can be inscribed by laser irradiation have also already been disclosed, for example in German Utility Model 81 30 861 U1. In these, high-contrast layers are laid one on top of the other, and inscription is achieved by burning through the upper layer using a laser beam. The emissions and gases produced during this operation require special protective precautions, such as extraction and filter systems. The production of multilayered laser labels of this type is complex and expensive.

DE 39 25 563 C2 discloses labels in sheet form which comprise a carrier and a plastic coating comprising PTFE permeated by a dark colour applied thereto. This label can be partly lightened in colour by means of a laser beam.

DE 41 08 377 A1 discloses a film paper laminate which can be inscribed from one side by means of pressure (ball-point pen) and from the other side by means of a laser beam. However, these labels cannot be used, for example, as code carriers for, for example, a motor vehicle to be assembled, in particular the body.

SUMMARY OF THE INVENTION

The object of the invention was to provide a laser label which is suitable as a code carrier and which avoids or at least reduces the disadvantages of the prior art. In order significantly to simplify for the user the production of the finished laminate comprising printed base label, which carries the information, and the single- or multilayered, transparent, self-adhesive protective film layers, it is desirable to provide the finished, unprinted laminate of base or protective labels. This can be produced more cheaply and in high quality by laminating the individual layers together and then stamping out labels. However, it can be used as a data carrier system with specific protection for the printed information only if subsequent printing between the base layer and the protective film is possible.

This can be achieved surprisingly and advantageously without the need temporarily to separate the base label and the protective label again. If the base label employed is a material to which the information can be applied without contact by light radiation, in particular laser irradiation, removal of the protective films is unnecessary.

DESCRIPTION OF THE PREFERRED EMBODIMENTS

In general, the base layer can be made of sheet-like plastic products which, owing to their chemical composition and/or through addition of specific additives, can be inscribed by means of lasers. For high-contrast and automatically readable inscription, it must be ensured that the protective films have, as far as possible, no strong absorptions in the wavelength region of the laser employed; this applies both to the base material and to the adhesive composition of the protective films. For a detailed design of the protective films, reference is made to EP 65 766 B1. If use is made of, for example, an Nd-YAG laser (emitted wavelength 1.06 $\mu$m), which, owing to its ray path, is particularly predestined for complex and changing inscriptions, virtually all plastic films which are clear and transparent in the visible region, such as polyester, polyethylene, polyacrylates, polypropylene, etc., can be used. The same also applies to the adhesive compositions, preference being given to polyacrylate adhesive compositions polymerized from aliphatic units.

Suitable additives include those described in DE 39 17 294, in particular coloured pigments and metal salts, especially copper hydroxide phosphate, or alternatively Iriodin, a pearlescent pigment, as is commercially available from Merck. These additives are admixed with the base polymer (as described, for example, in G 81 30 861), in particular in the order of a few parts per thousand to a maximum of 10 per cent. After production of sheet-like material by known processes, such as extrusion, casting, coating, etc., with, if desired, subsequent radiation-chemical crosslinking, such films are coated with self-adhesive compositions matched to the later applications. Covering with silicone-treated release paper then gives the typical structure of parent material from which labels can be made.

Suitable base layers comprise plastics, such as polyester, poly(meth)acrylates, polycarbonate, polyolefins, and radiation-curable systems, such as unsaturated polyesters, epoxy, polyester and urethane acrylates, as also used for UV printing inks, in particular those comprising a base polymer as described in G 81 30 816, namely aliphatic urethane acrylate oligomers.

Suitable self-adhesive compositions are commercially available, but also described in the literature, for example in German Patent 15 69 898.

Use of standard lasers, especially the widespread Nd-YAG solid-state lasers having a wavelength of 1.06 $\mu$m, results in a colour shift or colour change at the point where the laser hits the material surface, and sharp, high-contrast inscriptions and markings are obtained. In addition to a significant simplification of film production, further positive aspects are that the inscription speed can in some cases be considerably increased. Whereas hitherto a 5–25 $\mu$m top layer had to be evaporated and removed as an aerosol, the novel inscription process requires less energy, which, given the laser output available, allows an increase in the inscription speed.

If a suitable base label is available, the base film can, in a suitable setting of the inscription laser, be inscribed selectively through the one or more layers of protective labels, without the need to remove the latter and without the formation of gaseous emissions. The latter is particularly important, since gases formed would result in the formation of bubbles between the base label and the protective label—the resultant differences in light refraction and reflection would lead to misreadings by scanners or optical character recognition systems.

A further advantage of the outlined process is that the information applied to the base label is not only substantially protected by the protective films against mechanical, thermal and chemical attack, but the information is protected against undesired alteration even after removal of the final layer of protective films, since this information is not on the surface, but is inscribed into the plastic layer, i.e. is present in the film itself.

The ready-laminated multilayered label can be furnished in the manner described above with symbols such as logos, letters, numbers, bar codes, etc., which can later be used for identification purposes and for the control of processes.

EXAMPLE 1

As described in German Utility Model 81 30 861, the radiation-curing coating is prepared from 90% of a commercially available polyurethane acrylate and 10% of HDDA (hexanediol diacrylate). 2.5% of the additive copper hydroxide phosphate disclosed in DE 39 17 294 are incorporated with vigorous stirring. The paste is evenly coated in a thickness of 75 $\mu$m onto a high-gloss, biaxially stretched polyester film and cured by means of an electron beam (EB) under an inert gas. The structure is then coated with a known polyacrylate contact adhesive in a layer thickness of 25 g/m$^2$, namely with a pale, clear polyacrylate solvent adhesive composition polymerized predominantly from aliphatic acrylate monomers, such as ethylhexyl acrylate and butyl acrylate, as well as acrylic acid. The entire structure is bonded to a white adhesive substrate in order to increase the contrast. The protective film used is a crystal-clear polyester film, Kaladexs 1030 from ICI, with a thickness of 50 $\mu$m, which is likewise provided with an adhesive coating.

The inscription laser used is a tesa Label Lasers®, an Nd-YAG solid-state laser with a wavelength $\lambda$ of 1064 nm (rated laser output 25 W (CW) multimode), laser treatment with a pulse frequency of 5 kHz, writing rate of 350 mm/sec.

A high-contrast inscription with sharp contours is obtained, and there is no evidence of gas bubbles in the inscription area. Laser inscription of bar codes gives inscriptions which can be read automatically using scanners.

EXAMPLE 2

Base label with a thickness of approx. 100 $\mu$m analogous to Example 1, but coloured opacifying white with 15% of TiO$_2$ as pigment and with addition of 1.5% of copper hydroxide phosphate as additive. The protective film used is a highly transparent polypropylene film. Results as in Example 1.

EXAMPLE 3

Analogous to Example 1, but the base label is a 75 $\mu$m film comprising white-pigmented PBT (Vestodurs® X 7060 from Hüls). The protective film used is a protective label made from a highly transparent PET film (36 $\mu$m), such as Melinex® OD from ICI.

We claim:

1. Multilayered label comprising
   a) a base layer made of plastic containing
   b) an additive which exhibits a colour change under laser radiation, and which
   c) is coated on one side with a self adhesive composition which
   d) is, if desired, covered by a release paper or a release film, where
   e) the base layer is covered on the other side by one or more removable films arranged one on top of the other which
   f) are transparent, permeable to laser irradiation and are provided with a self adhesive coating, wherein the base layer comprises a polybutylene terephthalate or an electron beam-cured polyurethane acrylate paint.

2. A label according to claim 1, wherein the base layer comprises a paint.

3. A label according to claim 1, wherein the additive is a pigment, which is, used together with the additive titanium oxide.

4. A label according to claim 1, wherein the base layer has a thickness of from 10 to 200 $\mu$m, and the additive is employed in an amount of from 0.1 to 10% by weight based on the total weight of the base layer.

5. A label according to claim 1, wherein the protective film or films is(are) transparent and permeable to laser irradiation at least above the areas of the base layer intended for laser irradiation, and protect the base layer against chemical, mechanical, electrical or thermal stresses.

6. A label according to claim 1, wherein the protective film or films is(are) provided on one side with a transparent adhesive layer which is permeable to laser irradiation and in each case has(have) a tab for peeling off.

7. A label according to claim 6, wherein the outer protective film in each case covers the next-inward protective film together with its tab or the base layer.

8. A label according to claim 3, wherein said pigment is copper hydroxide phosphate or a pearlescent pigment.

9. A label according to claim 4, wherein said thickness ranges from 50 to 100 $\mu$m and the additive is used in an amount of from 0.5 to 5% by weight.

10. A label according to claim 5, wherein said protective film or films are resistant to chemicals, solvents and/or heat and/or are electrically insulating.

11. A method of marking a substrate with machine-readable markings comprising applying to the substrate a multilayered laser markable label according to claim 1, applying machine-readable markings to the label by means of a laser, processing the substrate marked with the laser label, after which, in order to re-establish readability of the markings, peeling off the uppermost protective film followed, if desired, by further processing operations followed by further peeling off of any further protective film.

* * * * *